United States Patent
Perumalla et al.

(10) Patent No.: US 11,878,717 B2
(45) Date of Patent: Jan. 23, 2024

(54) MIRAGE DETECTION BY AUTONOMOUS VEHICLES

(71) Applicant: International Business Machines Corporation, Armonk, NY (US)

(72) Inventors: Saraswathi Sailaja Perumalla, Visakhapatnam (IN); Sarbajit K. Rakshit, Kolkata (IN); Venkatrama Siva Kumar Vemuri, Visakhapatnam (IN); Ravi Sankar Parvathina, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 17/648,716

(22) Filed: Jan. 24, 2022

(65) Prior Publication Data
US 2023/0249710 A1    Aug. 10, 2023

(51) Int. Cl.
  *B60W 60/00*  (2020.01)
  *G05B 15/02*  (2006.01)
  *G08G 1/0967* (2006.01)

(52) U.S. Cl.
  CPC ......... *B60W 60/0015* (2020.02); *G05B 15/02* (2013.01); *G08G 1/096775* (2013.01);
  (Continued)

(58) Field of Classification Search
  CPC ....... B60W 2420/42; B60W 2554/801; B60W 2554/802; B60W 2556/40;
  (Continued)

(56) References Cited

U.S. PATENT DOCUMENTS

| | | | |
|---|---|---|---|
| 2015/0145995 A1* | 5/2015 | Shahraray | H04W 4/021 348/148 |
| 2017/0046958 A1* | 2/2017 | Naka | G08G 1/096791 |

(Continued)

FOREIGN PATENT DOCUMENTS

| | | |
|---|---|---|
| WO | 2014047250 A1 | 3/2014 |
| WO | 2020159961 A1 | 8/2020 |
| WO | 2021135371 A1 | 7/2021 |

OTHER PUBLICATIONS

"Patent Cooperation Treaty PCT International Search Report", International Application No. PCT/EP2023/051246, International Filing Date: Jan. 19, 2023, dated Apr. 11, 2023, 15 pages.
(Continued)

*Primary Examiner* — Babar Sarwar
(74) *Attorney, Agent, or Firm* — Michael O'Keefe (57) ABSTRACT

In an approach to mirage detection by autonomous vehicles, one or more computer processors monitor road conditions of a road on which an autonomous vehicle is traveling. One or more computer processors detect a visual indication of a water accumulation on the road. One or more computer processors determine whether one or more other vehicles are detected on the road ahead of the autonomous vehicle. Responsive to determining the one or more other vehicles are detected, one or more computer processors request information associated with road conditions of the road ahead of the autonomous vehicle from the one or more other vehicles. Based on a response to the request from the one or more other vehicles, one or more computer processors determine the one or more other vehicles did not detect the water accumulation. One or more computer processors determine the visual indication of the water accumulation is a mirage.

20 Claims, 3 Drawing Sheets

(52) U.S. Cl.
CPC ... *G08G 1/096791* (2013.01); *B60W 2420/42* (2013.01); *B60W 2554/801* (2020.02); *B60W 2554/802* (2020.02); *B60W 2556/40* (2020.02); *B60W 2556/45* (2020.02); *B60W 2556/65* (2020.02); *B60W 2720/10* (2013.01); *B60W 2720/12* (2013.01)

(58) Field of Classification Search
CPC ......... B60W 2556/45; B60W 2556/65; B60W 2720/10; B60W 2720/12; B60W 60/0015; G05B 15/02; G06V 20/58; G08G 1/096725; G08G 1/096741; G08G 1/09675; G08G 1/096758; G08G 1/096775; G08G 1/096783; G08G 1/096791; G08G 1/162; G08G 1/163; G08G 1/16
See application file for complete search history.

(56) References Cited

U.S. PATENT DOCUMENTS

| | | | |
|---|---|---|---|
| 2017/0241791 A1* | 8/2017 | Madigan | G06Q 40/08 |
| 2018/0151066 A1* | 5/2018 | Oba | B60W 60/0053 |
| 2019/0294167 A1* | 9/2019 | Kutila | G08G 1/096791 |
| 2019/0392562 A1* | 12/2019 | Othon | G06T 5/50 |
| 2020/0074862 A1* | 3/2020 | Johnston | G08G 1/22 |
| 2020/0406897 A1 | 12/2020 | Hartmann | |

OTHER PUBLICATIONS

Bosch, "Predictive road condition services", Bosch Mobility Solutions, 2021, 6 Pages.

\* cited by examiner

MIRAGE DETECTION BY AUTONOMOUS VEHICLES

BACKGROUND OF THE INVENTION

The present invention relates generally to the field of autonomous vehicles, and more particularly to mirage detection by autonomous vehicles.

A self-driving car, also known as an autonomous vehicle (AV or auto), driverless car, or robotic car, is a vehicle that is capable of sensing its environment and moving safely with little or no human input. Self-driving cars combine a variety of sensors to perceive their surroundings, such as radar, lidar, sonar, a global positioning system (GPS), odometry and inertial measurement units. Advanced control systems interpret sensory information to identify appropriate navigation paths, as well as obstacles and relevant signage.

A mirage is an optical phenomenon that creates the illusion of water and results from the refraction of light through a non-uniform medium. A mirage can be captured on camera since light rays are refracted to form the false image at the observer's location. What the image appears to represent, however, is determined by the interpretive faculties of the human mind. For example, inferior images on land are easily mistaken for the reflections from a small body of water. Mirages are often observed on sunny days when driving down a roadway. As a vehicle driver proceeds down the roadway, there appears to be an accumulation of water on the road in the distance.

SUMMARY

Embodiments of the present invention disclose a computer-implemented method, a computer program product, and a system for mirage detection by autonomous vehicles. The computer-implemented method may include one or more computer processors monitoring road conditions of a road on which an autonomous vehicle is traveling. One or more computer processors detect a visual indication of a water accumulation on the road. One or more computer processors determine whether one or more other vehicles are detected on the road ahead of the autonomous vehicle. In response to determining the one or more other vehicles are detected on the road ahead of the autonomous vehicle, one or more computer processors request information associated with road conditions of the road ahead of the autonomous vehicle from the one or more other vehicles. Based on a response to the request from the one or more other vehicles, one or more computer processors determine the one or more other vehicles did not detect the water accumulation. One or more computer processors determine the visual indication of the water accumulation is a mirage.

DETAILED DESCRIPTION

An autonomous vehicle is equipped with a vision system that can detect the presence of water on a road up ahead and change the driving parameters accordingly. For example, the autonomous vehicle may reduce the traveling speed in anticipation of contacting the water, in order to keep the vehicle in control. When an autonomous vehicle travels along a roadway on a sunny day, the vision system of the autonomous vehicle may be confused by a scenario on the road and change the driving parameters unnecessarily, which may result in discomfort for the passenger.

Embodiments of the present invention recognize that safety and comfort of passengers of autonomous vehicles can be improved by providing a system that can recognize whether a detected accumulation of water on a roadway is either a mirage or actual water such that the autonomous vehicle can maintain appropriate driving parameters. Embodiments of the present invention also recognize that efficiency can be improved by implementing a system that proactively communicates with a cloud server and/or other vehicles traveling on the same road to aggregate data from Internet of Things (IoT) device feeds in the surrounding area to inform the prediction of whether the detected accumulated water is or is not a mirage. Implementation of embodiments of the invention may take a variety of forms, and exemplary implementation details are discussed subsequently with reference to the Figures.

Figure 1:
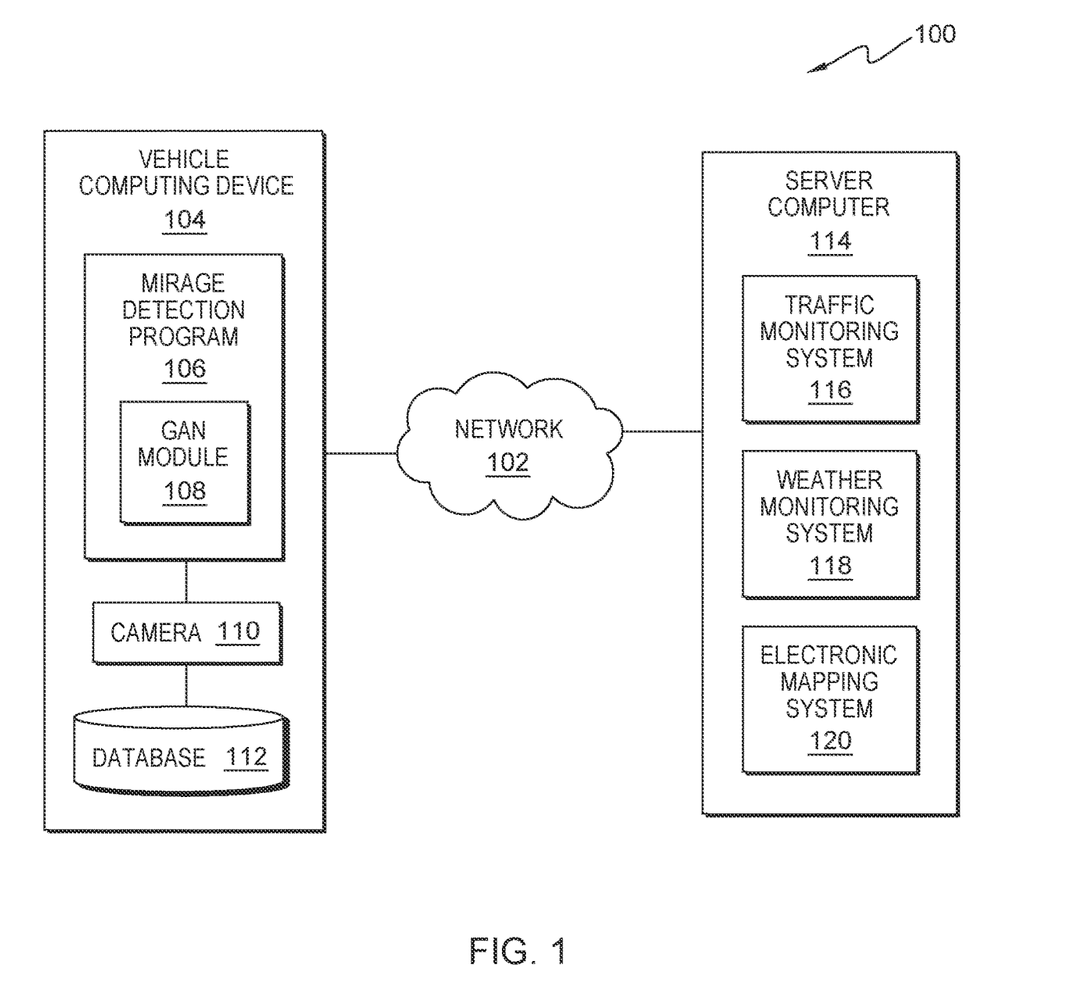
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Vehicle computing device 104 can be one or more of a laptop computer, a tablet computer, a smart phone, smart watch, a smart speaker, or any programmable electronic device capable of communicating with various components and devices within distributed data processing environment 100, via network 102. In an embodiment, vehicle computing device 104 may be integrated into an autonomous vehicle. In general, vehicle computing device 104 represents one or more programmable electronic devices or combination of programmable electronic devices capable of executing machine readable program instructions and communicating with other computing devices (not shown) within distributed data processing environment 100 via a network, such as network 102. Vehicle computing device 104 includes mirage detection program 106, camera 110, and database 112. Vehicle computing device 104 may include internal and external hardware components, as depicted and described in further detail with respect to FIG. 3.

Mirage detection program 106 communicates with a cloud server and/or other vehicles traveling on the same road as an autonomous vehicle with which vehicle computing device 104 is associated to aggregate data to inform a prediction of whether accumulated water detected on the road by the autonomous vehicle is or is not a mirage. Mirage detection program 106 monitors road conditions and determines whether water accumulation on the road is detected. If mirage detection program 106 detects water accumulation on the road, then mirage detection program 106 determines whether there are other vehicles on the road ahead of the autonomous vehicle. If mirage detection program 106 detects other vehicles, then mirage detection program 106 requests road conditions from the other vehicles to determine whether one or more other vehicles detect accumulated water on the road. If mirage detection program 106 does not detect other vehicles, then mirage detection program 106 requests traffic and/or weather data from server computer 114. If mirage detection program 106 determines the requested data does not include evidence of water accumulated on the road, then mirage detection program 106 determines whether mapping data indicates any water has flowed to the road from a nearby body of water. If mirage detection program 106 determines, based on data from other vehicles, traffic data, weather data, and/or mapping data that water is accumulated on the road, then mirage detection program 106 estimates the distance to the accumulated water and adjusts the speed of the autonomous vehicle. If mirage detection program 106 determines, based on data from other vehicles, traffic data, weather data, and/or mapping data that water is not accumulated on the road, then mirage detection program 106 determines the view of the water is a mirage and adjusts the windshield image. Mirage detection program 106 transmits road condition data. Mirage detection program 106 includes generative adversarial networks (GAN) module 108. Mirage detection program 106 is depicted and described in further detail with respect to FIG. 2.

GAN module 108 is one or more of a plurality of machine learning frameworks that includes two neural networks. Given a training set, GAN module 108 learns to generate new data with the same statistics as the training set. For example, a GAN trained on photographs can generate new photographs that look at least superficially authentic to human observers, having many realistic characteristics. In an embodiment, mirage detection program 106 uses GAN module 108 to adjust the image seen through the windshield of the autonomous vehicle.

Camera 110 may be one or more of a plurality of types of cameras, including, but not limited to, pinhole, stereo, omni-directional, non-central, infrared, video, digital, three dimensional, panoramic, filter-based, wide-field, narrow-field, telescopic, microscopic, etc. Camera 110 may also be one or more of a single body camera, a stereo camera, and a time of flight (TOF) camera. A single body camera generates a captured image from one viewpoint. A stereo camera can generate captured images from a plurality of viewpoints to calculate a distance to a subject on the basis of the captured images from the plurality of viewpoints. A TOF camera can measure the distance on the basis of reflected light delay of a pulse light and a modulated light.

Database 112 stores information used by and generated by mirage detection program 106. In the depicted embodiment, database 112 resides on vehicle computing device 104. In another embodiment, database 112 may reside elsewhere within distributed data processing environment 100, provided that mirage detection program 106 has access to database 112. A database is an organized collection of data. Database 112 can be implemented with any type of storage device capable of storing data and configuration files that can be accessed and utilized by mirage detection program 106, such as a database server, a hard disk drive, or a flash memory. Database 112 stores data feed from one or more other vehicles on the road ahead of the autonomous vehicle. Database 112 may also store data received from one or more cloud service providers. For example, database 112 may store traffic data, weather data, and/or mapping data. Database 112 may also store images captured by camera 110.

Server computer 114 can be a standalone computing device, a management server, a web server, a mobile computing device, or any other electronic device or computing system capable of receiving, sending, and processing data. In other embodiments, server computer 114 can represent a server computing system utilizing multiple computers as a server system, such as in a cloud computing environment. In another embodiment, server computer 114 can be a laptop computer, a tablet computer, a netbook computer, a personal computer (PC), a desktop computer, a personal digital assistant (PDA), a smart phone, or any programmable electronic device capable of communicating with vehicle computing device 104 and other computing devices (not shown) within distributed data processing environment 100 via network 102. In another embodiment, server computer 114 represents a computing system utilizing clustered computers and components (e.g., database server computers, application server computers, etc.) that act as a single pool of seamless resources when accessed within distributed data processing environment 100. Server computer 114 includes traffic monitoring system 116, weather monitoring system 118, and electronic mapping system 120.

Traffic monitoring system 116 is one or more of a plurality of systems that gather and distribute data and information about road conditions, such as traffic congestion, detours, and traffic collisions. The data distributed by traffic monitoring system 116 may help drivers anticipate and avoid traffic problems. Traffic monitoring system 116 can transmit data to one or more of smartphones, personal computers, global positioning systems (GPS), electronic road signs, smart vehicles, i.e., a vehicle with an integrated smart device, etc. Traffic monitoring system 116 can gather data by one or more of crowdsourced data from smartphone users, crowdsourced data from smart vehicles, police radio broadcasts, traffic cameras, smart road sensors, etc. In the depicted embodiment, traffic monitoring system 116 resides on server computer 114. In another embodiment, traffic monitoring system 116 resides elsewhere in distributed data processing environment 100 provided that mirage detection program 106 has access to traffic monitoring system 116.

Weather monitoring system 118 is one or more of a plurality of systems that gather and distribute weather data and information, including past and current weather conditions, weather forecasts, warnings of hazardous weather, and/or other weather-related products. Weather monitoring system 118 gathers weather data from instruments located at one or more of weather observation stations, marine observations, upper air observations, etc. In the depicted embodiment, weather monitoring system 118 resides on server computer 114. In another embodiment, weather monitoring system 118 resides elsewhere in distributed data processing environment 100 provided that mirage detection program 106 has access to weather monitoring system 118.

Electronic mapping system 120 is one or more of a plurality of systems that gather and distribute mapping data and information, including street maps, 360° interactive panoramic views of streets, geographic data, entity information, such as the location of restaurants, gas stations, etc., and route planning for traveling by foot, car, and public transportation. Electronic mapping system 120 gathers mapping data from aerial photography, satellites, etc. In the depicted embodiment, electronic mapping system 120 resides on server computer 114. In another embodiment, electronic mapping system 120 resides elsewhere in distributed data processing environment 100 provided that mirage detection program 106 has access to traffic monitoring system 116.

Figure 2:
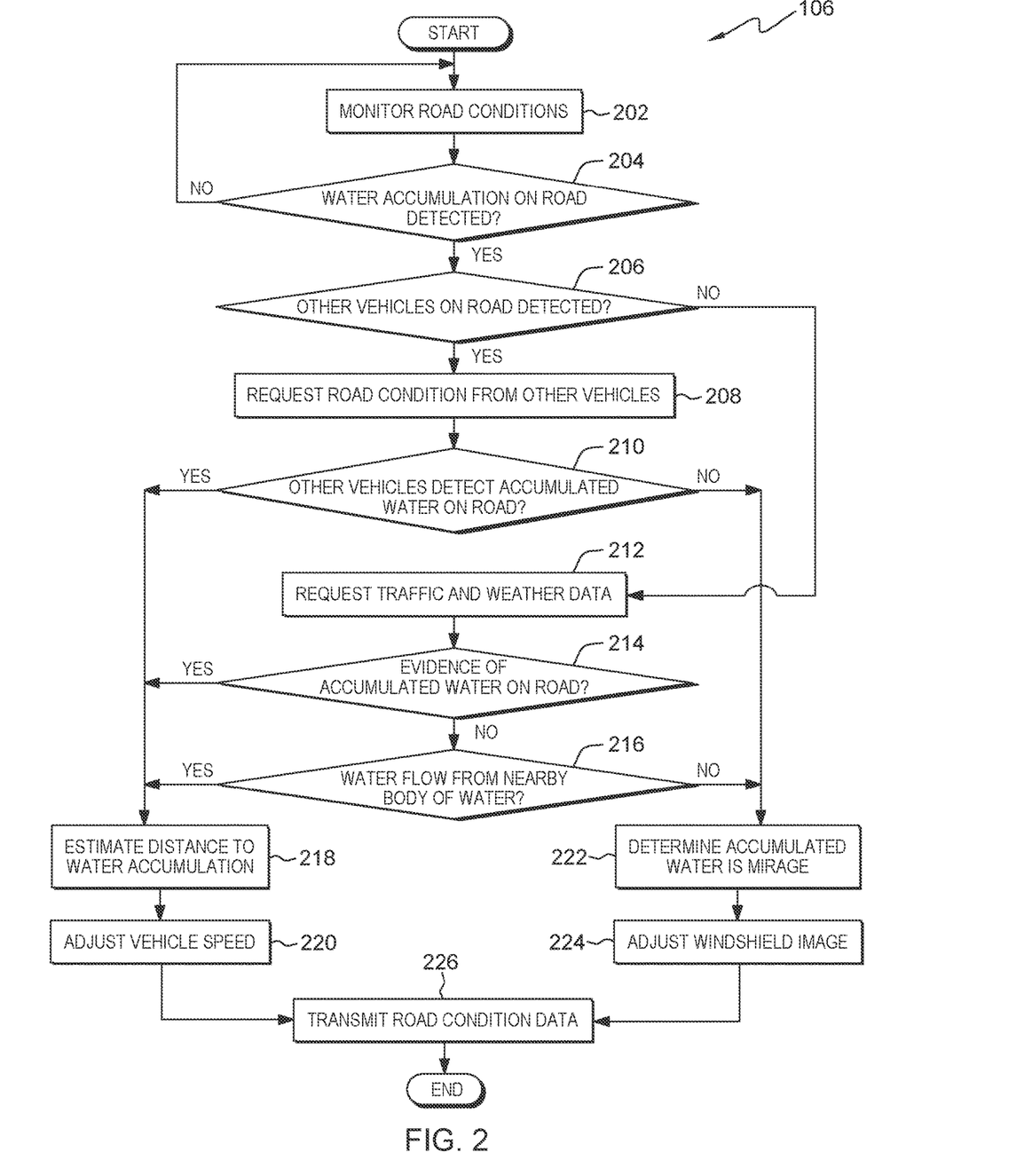
FIG. 2 is a flowchart depicting operational steps of a mirage detection program, on a vehicle computing device within the distributed data processing environment of FIG. 1, for mirage detection by an autonomous vehicle, in accordance with an embodiment of the present invention.

FIG. 2 is a flowchart depicting operational steps of mirage detection program 106, on vehicle computing device 104 within distributed data processing environment 100 of FIG. 1, for mirage detection by an autonomous vehicle, in accordance with an embodiment of the present invention.

Mirage detection program 106 monitors road conditions (step 202). In an embodiment, in order to determine whether any detected water accumulated on the road is a mirage, mirage detection program 106 continuously monitors the conditions of the road up ahead of the autonomous vehicle in which vehicle computing device 104 resides. In an embodiment, mirage detection program 106 uses camera 110 to provide visual input of the road conditions and performs image analysis on one or more images captured by camera 110. Road conditions may include, but are not limited to, the presence of water, ice, snow and/or sleet on the road, as well as the presence of potholes, debris, animals, other vehicles, etc. In an embodiment, mirage detection program 106 also monitors weather conditions that may or may not be favorable for observing a mirage. For example, mirage detection program 106 determines whether it is sunny or raining. In an embodiment where mirage detection program 106 monitors weather conditions, mirage detection program 106 predicts whether the conditions are right (i.e., optimal) for the generation of a mirage and proactively aggregates data to support or refute the prediction prior to detecting an accumulation of water in the road.

Mirage detection program 106 determines whether water accumulation on the road is detected (decision block 204). In an embodiment, based on the image analysis of the road conditions, mirage detection program 106 determines whether a visual indication of an accumulation of water appears on the road ahead of the autonomous vehicle. If mirage detection program 106 does not detect water accumulation on the road ("no" branch, decision block 204), then mirage detection program 106 returns to step 202 and continues to monitor road conditions.

If mirage detection program 106 detects water accumulation on the road ("yes" branch, decision block 204), then mirage detection program 106 determines whether other vehicles are detected (decision block 206). In an embodiment, mirage detection program 106 determines whether one or more vehicles are traveling on the road ahead of the autonomous vehicle. In an embodiment, mirage detection program 106 detects the presence of one or more other vehicles via image analysis of images captured by camera 110. In another embodiment, mirage detection program 106 detects the presence of one or more other vehicles by determining whether one or more other vehicles are transmitting a data feed to one or more cloud services on server computer 114 or to vehicle computing device 104.

If mirage detection program 106 detects other vehicles ("yes" branch, decision block 206), then mirage detection program 106 requests road conditions from the other vehicles (step 208). In an embodiment, mirage detection program 106 transmits a request for information associated with the road conditions to the one or more vehicles to determine whether the one or more other vehicles observed or detected accumulated water on the road. In an embodiment, mirage detection program 106 transmits the request to a road condition monitoring system integrated into the one or more vehicles. In another embodiment, mirage detection program 106 transmits the request to a computing device associated with the driver of a vehicle, such as a smart phone. In an embodiment where the autonomous vehicle is traveling on a smart road, i.e., a road constructed with various sensors either embedded in the road or positioned within a critical distance from the road, mirage detection program 106 transmits the request to a cloud system monitoring the smart road, such as traffic monitoring system 116. In an embodiment, mirage detection program 106 continuously receives data transmitted by the road condition monitoring system integrated into the one or more other vehicles, the computing device associated with the driver of a vehicle, and/or the smart road without having to transmit a request.

Mirage detection program 106 determines whether other vehicles detect accumulated water on the road (decision block 210). In an embodiment, based on the received road condition data from the one or more other vehicles, mirage detection program 106 can determine whether the one or more other vehicles detect an accumulation of water on the road. For example, mirage detection program 106 may receive data from sensors in one or more tires of a vehicle up ahead that indicates the tire surface has changed from dry to wet. In an embodiment where the autonomous vehicle is traveling on a smart road, mirage detection program 106 may receive an alert, for example, a message stating "Caution—wet road up ahead. Adjust speed accordingly." In an embodiment, mirage detection program 106 determines whether one or more other vehicles on the road detect an accumulation of water by performing image analysis using one or more images captured by camera 110. For example, mirage detection program 106 may detect water spray on either side of the vehicle. In another embodiment, mirage detection program 106 determines whether one or more other vehicles on the road detect water accumulated on the road by detecting a deceleration of the speed of another vehicle.

If mirage detection program 106 does not detect other vehicles ("no" branch, decision block 206), then mirage detection program 106 requests traffic and/or weather data (step 212). In an embodiment, mirage detection program 106 requests traffic and/or weather data associated with the road conditions from one or more cloud service providers to determine whether there is evidence of accumulated water on the road. In an embodiment, mirage detection program 106 requests traffic data from traffic monitoring system 116 on server computer 114. For example, mirage detection program 106 may request data regarding the number and/or timing of other vehicles traveling in the current location of the autonomous vehicle, such as when was the last time another vehicle moved through the area of the road that appears to have accumulated water. Based on the response, mirage detection program 106 can determine whether a vehicle that passed the location within a threshold time duration encountered water accumulated in the road. For example, mirage detection program 106 can determine that a truck had passed the location within a half hour of mirage detection program 106 detecting the accumulation of water. In an embodiment, mirage detection program 106 requests weather data from weather monitoring system 118 on server computer 114. For example, mirage detection program 106 may request data regarding the last time rain, or any other precipitation, fell in the current location of the autonomous vehicle.

Mirage detection program 106 determines whether the requested traffic and/or weather data includes evidence of water accumulated on the road (decision block 214). In an embodiment, in response to receiving the requested traffic and/or weather data, mirage detection program 106 analyzes the received data to determine whether the data includes any evidence of water accumulated on the road. Based on the response, mirage detection program 106 can determine a likelihood of the road being wet with accumulated water.

If mirage detection program 106 determines the requested traffic and/or weather data does not include evidence of water accumulated on the road ("no" branch, decision block 214), then mirage detection program 106 determines whether any water has flowed to the road from a nearby body of water (decision block 216). In an embodiment, mirage detection program 106 communicates with electronic mapping system 120 on server computer 114 to request mapping data of the area of the autonomous vehicle, analyze the mapping data, and locate one or more bodies of water within a threshold distance from the road. For example, mirage detection program 106 may analyze any bodies of water within a ten-mile radius. Based on the mapping data analysis, mirage detection program 106 determines a probability that water from the nearby body of water has flowed onto the road. In an embodiment, mirage detection program 106 combines the weather data and the mapping data to determine the probability that water from the nearby body of water has flowed onto the road. In an embodiment, the mapping data includes data related to any nearby incidents that could cause water to flow on the roadway. For example, the mapping data may include a description of a broken water pipe in the area.

If mirage detection program 106 determines, based on road condition information from other vehicles, traffic data, weather data, and/or mapping data that water is accumulated on the road ("yes" branches, decision block 210, decision block 214, or decision block 216), then mirage detection program 106 estimates the distance to the accumulated water (step 218). In an embodiment, mirage detection program 106 uses image analysis to estimate the distance between the autonomous vehicle and the accumulated water in the road. By determining the distance, mirage detection program 106 can determine when to adjust the speed of the autonomous vehicle and how quickly to adjust the speed.

Mirage detection program 106 adjusts the speed of the autonomous vehicle (step 220). In an embodiment, based on the estimated distance to the accumulated water in the road, mirage detection program 106 adjusts the speed of the autonomous vehicle. Mirage detection program 106 determines an appropriate speed for which the autonomous vehicle can safely travel through the accumulated water without creating an unsafe situation, such as hydroplaning. In addition, mirage detection program 106 determines a deceleration rate for the autonomous vehicle such that the one or more passengers do not experience discomfort during deceleration, such as a quick jerk. Mirage detection program 106 adjusts the speed and/or deceleration rate based on the safety and comfort considerations.

If mirage detection program 106 determines, based on data from other vehicles, traffic data, weather data, and/or mapping data that water is not accumulated on the road ("no" branches, decision block 210 or decision block 216), then mirage detection program 106 determines the accumulated water is a mirage (step 222). In an embodiment, in response to determining there is insufficient data from one or more sources to support the presence of accumulated water in the road, mirage detection program 106 determines the detected accumulated water is a mirage. Mirage detection program 106 nullifies the initial detection of the water accumulation, as discussed with respect to decision block 204, above. In an embodiment, in response to determining the accumulated water is a mirage, mirage detection program 106 maintains the current driving parameters of the autonomous vehicle. For example, mirage detection program 106 does not adjust the speed of the autonomous vehicle.

Mirage detection program 106 adjusts the windshield image (step 224). In an embodiment, mirage detection program 106 uses GAN module 108 to update the image of the road through the windshield for the one or more passengers of the autonomous vehicle such that the passengers do not have a view of the mirage but have a virtual view of the actual surroundings. By adjusting the image, mirage detection program 106 prevents confusion or concern of the passengers due to viewing the mirage. In an embodiment, the windshield of the autonomous vehicle includes a projection module and/or an augmented reality system to enable mirage detection program 106 to adjust the windshield image with feed from GAN module 108.

Mirage detection program 106 transmits road condition data (step 226). In response to determining either the detected accumulated water is or is not a mirage, mirage detection program 106 transmits road condition data to one or more cloud service providers. For example, mirage detection program 106 may transmit the presence of a mirage to traffic monitoring system 116 such that other vehicles have access to the data. In another embodiment, mirage detection program 106 transmits road condition data to one or more vehicles within a pre-defined proximity behind the autonomous vehicle. For example, mirage detection program 106 may transmit the presence of accumulated water in the road to any vehicles within twenty miles of the autonomous vehicle such that systems operating in those vehicles can determine a distance to accumulated water in the road and adjust the speed of the vehicles accordingly.

In an embodiment, mirage detection program 106 operates on a device associated with a user, where the user is a driver or a passenger in a standard vehicle, i.e., a vehicle that is not autonomous. For example, mirage detection program 106 may be an application (i.e., an "app") on the user's smartphone. In the embodiment, the user initiates mirage detection program 106 on the device via a user interface. In the embodiment, mirage detection program 106 operates as discussed with respect to each of the steps in FIG. 2. In another embodiment, instead of automatically adjusting the vehicle speed or the windshield image, as discussed with respect to steps 220 and 224, respectively, mirage detection program 106 communicates a recommendation to the user and waits for the user response before performing those actions. In one embodiment, the device includes a camera with which mirage detection program 106 communicates for image capturing of the road conditions. In another embodiment, mirage detection program 106 communicates with one or more cameras integrated with the vehicle for image capturing of the road conditions.

Figure 3:
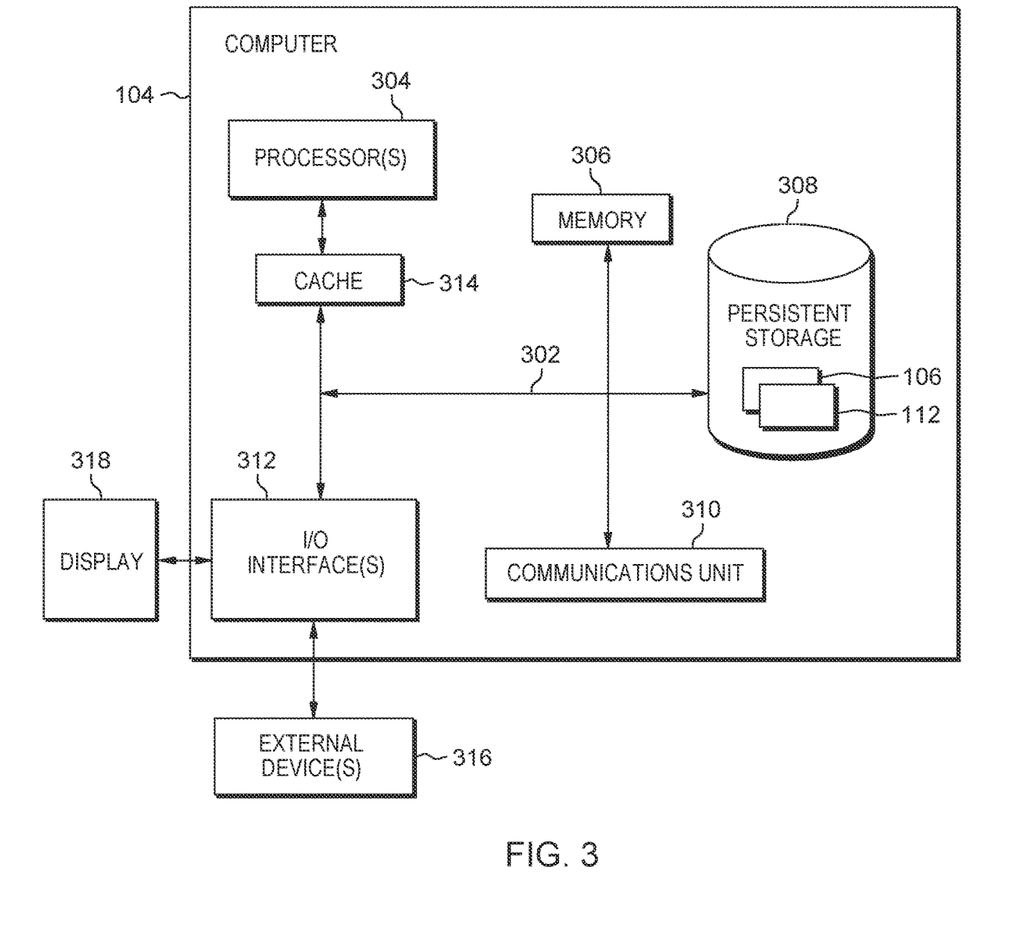
FIG. 3 depicts a block diagram of components of the vehicle computing device executing the mirage detection program within the distributed data processing environment of FIG. 1, in accordance with an embodiment of the present invention.

FIG. 3 depicts a block diagram of components of vehicle computing device 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Vehicle computing device 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., mirage detection program 106 and database 112, are stored in persistent storage 308 for execution and/or access by one or more of the respective processor(s) 304 of vehicle computing device 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of server computer 114. In these examples, communications unit 310 includes one or more network interface cards. Communications unit 310 may provide communications through the use of either or both physical and wireless communications links. Mirage detection program 106, database 112, and other programs and data used for implementation of the present invention, may be downloaded to persistent storage 308 of vehicle computing device 104 through communications unit 310.

I/O interface(s) 312 allows for input and output of data with other devices that may be connected to vehicle computing device 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., mirage detection program 106 and database 112, on vehicle computing device 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   monitoring, by one or more computer processors, road conditions of a road on which an autonomous vehicle is traveling;
   detecting, by one or more computer processors, a visual indication of a water accumulation on the road;
   determining, by one or more computer processors, whether one or more other vehicles are detected on the road ahead of the autonomous vehicle;
   responsive to determining the one or more other vehicles are detected on the road ahead of the autonomous vehicle, requesting, by one or more computer processors, information associated with road conditions of the road ahead of the autonomous vehicle from the one or more other vehicles;
   based on a response to the request from the one or more other vehicles, determining, by one or more computer processors, the one or more other vehicles did not detect the water accumulation; and
   determining, by one or more computer processors, the visual indication of the water accumulation is a mirage, wherein the mirage is an optical phenomenon that creates an illusion of water resulting from the refraction of light through a non-uniform medium.

2. The computer-implemented method of claim 1, further comprising:
   responsive to determining the one or more other vehicles are not detected on the road ahead of the autonomous vehicle, requesting, by one or more computer processors, data associated with the road conditions from one or more service providers;
   based on the data associated with the road conditions, determining, by one or more computer processors, whether there is evidence of the water accumulation;
   responsive to determining there is no evidence of the water accumulation, determining, by one or more computer processors, whether water has flowed to the road from a nearby body of water; and
   responsive to determining water has not flowed to the road from the nearby body of water, determining, by one or more computer processors, the water accumulation is the mirage.

3. The computer-implemented method of claim 2, wherein the one or more service providers include at least one of a traffic monitoring system, a weather monitoring system, and an electronic mapping system.

4. The computer-implemented method of claim 2, further comprising:
   transmitting, by one or more computer processors, road condition data to at least one of the one or more service providers.

5. The computer-implemented method of claim 2, further comprising:
   responsive to determining there is evidence of the water accumulation, estimating, by one or more computer processors, a first distance from the autonomous vehicle to the water accumulation; and
   adjusting, by one or more computer processors, a speed of the autonomous vehicle based on the estimated first distance.

6. The computer-implemented method of claim 2, further comprising:
   responsive to determining the water has flowed to the road from the nearby body of water, estimating, by one or more computer processors, a second distance from the autonomous vehicle to the water accumulation; and
   adjusting, by one or more computer processors, a speed of the autonomous vehicle based on the estimated second distance.

7. The computer-implemented method of claim 2, wherein determining whether the water has flowed to the road from the nearby body of water comprises:
   requesting, by one or more computer processors, mapping data from one of the one or more service providers;
   analyzing, by one or more computer processors, the mapping data received from one of the one or more service providers to locate one or more nearby bodies of water; and
   based on the mapping data analysis, determining, by one or more computer processors, the one or more bodies of water are located within a threshold distance from the road; and
   based on the one or more bodies of water located within a threshold distance from the road, determining, by one or more computer processors, a probability that water from the one or more nearby bodies of water has flowed onto the road.

8. The computer-implemented method of claim 1, further comprising:
   based on the response to the request from the one or more other vehicles, determining, by one or more computer processors, the one or more other vehicles did detect the water accumulation;
   estimating, by one or more computer processors, a third distance from the autonomous vehicle to the water accumulation; and
   adjusting, by one or more computer processors, a speed of the autonomous vehicle based on the estimated third distance.

9. The computer-implemented method of claim 1, further comprising:
   transmitting, by one or more computer processors, road condition data to at least one of the one or more other vehicles.

10. The computer-implemented method of claim 1, further comprising:
    responsive to determining the visual indication of the water accumulation is the mirage, adjusting, by one or more computer processors, using a generative adversarial network (GAN) module, an image in a windshield of the autonomous vehicle to a virtual view of actual surroundings that does not include the mirage.

11. A computer program product comprising:
    one or more computer readable storage media and program instructions collectively stored on the one or more computer readable storage media, the stored program instructions comprising:
    program instructions to monitor road conditions of a road on which an autonomous vehicle is traveling;
    program instructions to detect a visual indication of a water accumulation on the road;
    program instructions to determine whether one or more other vehicles are detected on the road ahead of the autonomous vehicle;
    responsive to determining the one or more other vehicles are detected on the road ahead of the autonomous vehicle, program instructions to request information associated with road conditions of the road ahead of the autonomous vehicle from the one or more other vehicles;
    based on a response to the request from the one or more other vehicles, program instructions to determine the one or more other vehicles did not detect the water accumulation; and
    program instructions to determine the visual indication of the water accumulation is a mirage, wherein the mirage is an optical phenomenon that creates an illusion of water resulting from the refraction of light through a non-uniform medium.

12. The computer program product of claim 11, the stored program instructions further comprising:
    responsive to determining the one or more other vehicles are not detected on the road ahead of the autonomous vehicle, program instructions to request data associated with the road conditions from one or more service providers;
    based on the data associated with the road conditions, program instructions to determine whether there is evidence of the water accumulation;
    responsive to determining there is no evidence of the water accumulation, program instructions to determine whether water has flowed to the road from a nearby body of water; and
    responsive to determining water has not flowed to the road from the nearby body of water, program instructions to determine the water accumulation is the mirage.

13. The computer program product of claim 12, the stored program instructions further comprising:
    responsive to determining there is evidence of the water accumulation, program instructions to estimate a first distance from the autonomous vehicle to the water accumulation; and
    program instructions to adjust a speed of the autonomous vehicle based on the estimated first distance.

14. The computer program product of claim 11, the stored program instructions further comprising:
    based on the response to the request from the one or more other vehicles, program instructions to determine the one or more other vehicles did detect the water accumulation;
    program instructions to estimate a third distance from the autonomous vehicle to the water accumulation; and
    program instructions to adjust a speed of the autonomous vehicle based on the estimated third distance.

15. The computer program product of claim 11, the stored program instructions further comprising:
    responsive to determining the visual indication of the water accumulation is the mirage, program instructions to adjust, using a generative adversarial network (GAN) module, an image in a windshield of the autonomous vehicle to a virtual view of actual surroundings that does not include the mirage.

16. A computer system comprising:
one or more computer processors;
one or more computer readable storage media;
program instructions collectively stored on the one or more computer readable storage media for execution by at least one of the one or more computer processors, the stored program instructions comprising:
program instructions to monitor road conditions of a road on which an autonomous vehicle is traveling;
program instructions to detect a visual indication of a water accumulation on the road;
program instructions to determine whether one or more other vehicles are detected on the road ahead of the autonomous vehicle;
responsive to determining the one or more other vehicles are detected on the road ahead of the autonomous vehicle, program instructions to request information associated with road conditions of the road ahead of the autonomous vehicle from the one or more other vehicles;
based on a response to the request from the one or more other vehicles, program instructions to determine the one or more other vehicles did not detect the water accumulation; and
program instructions to determine the visual indication of the water accumulation is a mirage, wherein the mirage is an optical phenomenon that creates an illusion of water resulting from the refraction of light through a non-uniform medium.

17. The computer system of claim 16, the stored program instructions further comprising:
responsive to determining the one or more other vehicles are not detected on the road ahead of the autonomous vehicle, program instructions to request data associated with the road conditions from one or more service providers;
based on the data associated with the road conditions, program instructions to determine whether there is evidence of the water accumulation;
responsive to determining there is no evidence of the water accumulation, program instructions to determine whether water has flowed to the road from a nearby body of water; and
responsive to determining water has not flowed to the road from the nearby body of water, program instructions to determine the water accumulation is the mirage.

18. The computer system of claim 17, the stored program instructions further comprising:
responsive to determining there is evidence of the water accumulation, program instructions to estimate a first distance from the autonomous vehicle to the water accumulation; and
program instructions to adjust a speed of the autonomous vehicle based on the estimated first distance.

19. The computer system of claim 16, the stored program instructions further comprising:
based on the response to the request from the one or more other vehicles, program instructions to determine the one or more other vehicles did detect the water accumulation;
program instructions to estimate a third distance from the autonomous vehicle to the water accumulation; and
program instructions to adjust a speed of the autonomous vehicle based on the estimated third distance.

20. The computer system of claim 16, the stored program instructions further comprising:
responsive to determining the visual indication of the water accumulation is the mirage, program instructions to adjust, using a generative adversarial network (GAN) module, an image in a windshield of the autonomous vehicle to a virtual view of actual surroundings that does not include the mirage.

* * * * *